UNITED STATES PATENT OFFICE.

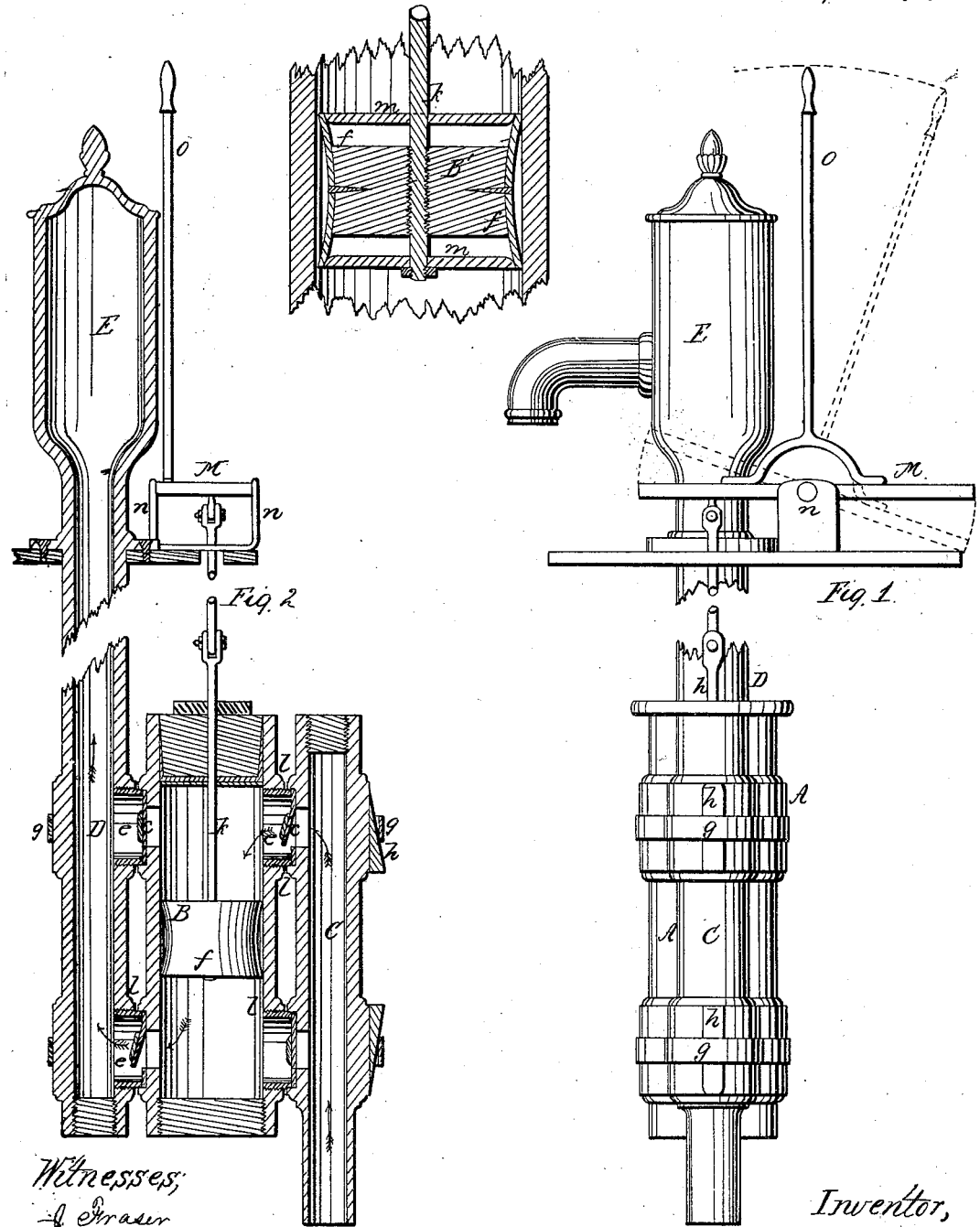

T. J. WILLETT, OF NUNDA, NEW YORK.

IMPROVEMENT IN PUMPS.

Specification forming part of Letters Patent No. 33,914, dated December 10, 1861.

*To all whom it may concern:*

Be it known that I, T. J. WILLETT, of Nunda, in the county of Livingston and State of New York, have invented a new and useful Improvement in Pumps; and I do hereby declare that the following is a full and exact description thereof, reference being had to the accompanying drawings, making part of this specification, in which—

Figure 1 is an elevation of my improved pump. Fig. 2 is a vertical section of the same, the piston being shown in elevation. Fig. 3 is an enlarged vertical section of the piston, showing its construction, together with a portion of the cylinder.

Like letters designate corresponding parts in all of the figures.

My improvement relates to the mode of applying the brake or lever for operating the piston, to the construction of the piston, and to the method of connecting the pipes and cylinder together. It is equally applicable where wood or iron is used in the construction, and, as represented in the drawings, wood is the material used for the pump-barrel and pipes, and iron for the other parts, except the packing.

As shown in the drawings, A is the cylinder; B, the piston; C, the suction-pipe, and D the raising-pipe, connected with the air-chamber E and discharge-spout in the usual manner.

I prefer, where the depth of the well will admit, to place the cylinder below the water and employ it as a lift-pump, in which case the suction-pipe C may be dispensed with and the water taken at the two valves $b$ $c$; but it may be used equally well for a suction-pump.

The pipes C D are connected with the cylinder by means of metal thimbles $e$ $e$, which may be inserted in an annular recess around the valve-aperture, with packing interposed between the wood and edge of the thimble, as seen at $i$ $i$, if necessary, to render the joints tight; or a screw may be cut on the outside of the surface and made to enter the fibers of the wood, as at $l$ $l$. A band or strap of iron $g$ is then passed around the outside of the cylinder and pipes and a wedge or key $h$ is driven in to tighten the parts together. This holds the cylinder and pipes in such close connection with the edges of the thimbles as to render the joints tight, usually without packing, if they are of wood, as the fibers yield sufficiently to answer the purpose of packing; but if the whole is made of metal, packing will be necessary. The wedges may be tightened occasionally, if required; but if this part of the pump is used under the water it will always remain tight. Set-screws may be used in place of the wedges; but I prefer the latter as cheaper and equally secure. Much saving of expense is effected by this method of connecting the parts, even if the pump be made wholly of iron; but the chief object of the improvement is to enable a pump to be made chiefly of wood which will be as effective and durable in most situations, and especially as a lift-pump, as if made of iron, while the cost will be greatly reduced. The pipes may be made of iron, if desired, and connected with a wooden cylinder by turning the ends of the pipes to the cylinder, the bands $g$ being used in the same manner.

I construct the piston of a solid wooden cylinder B', the rod $k$ passing through it and being connected by a thread on the rod. The periphery of the piston-cylinder is made somewhat concave and is covered with thick packing-leather, the ends of which project beyond the block. It is drawn tight and held by nails or screws around the middle of the block, which causes it to assume the form of the piston-cylinder, its edges expanding as it is contracted in the middle. Two metallic disks $m$ $m$, of a diameter nearly equal to that of the bore of the cylinder, are placed on the piston-rod, one above and the other below the block B'. The lower one is held on the rod by a nut on the end thereof, which suspends it a little below the block, leaving a chamber between, and the upper one rests with its edges on that of the packing $f$. Both are free to move on the piston-rod and have their edges which are toward each other beveled or rounded off. When the stroke of the piston is down, the lower disk is forced by the pressure of the water upon the packing-leather, which is expanded by the beveled edges and thereby kept in close contact with the sides of the cylinder, so that it cannot fail of packing tight. The upper one acts in the same manner when the stroke is upward, and thus the piston is made self packing and regulating, the pressure on the packing varying in proportion to the force of the water moved. The piston may be used without requiring alteration until the leather packing wears out, as the device works equally well whether the leather be thick or thin.

To enable the pump to be worked with greater ease, I attach the piston-rod by a jointed connecting-rod to the rocking platform M, which consists of a piece of plank having pivot or journal bearings in the steps $n\ n$. These bearings are about the middle of the platform, and the brake or lever is placed in a fixed vertical position on the plank directly over that point. It is of a suitable height for a person to use when standing on the platform M, in which position the opererator, by swaying his body with the oscillation of the lever and plank, works the pump with but slight exertion, the weight of the body giving impulse to the lever instead of the muscular action of the arms. The connecting-rod may be placed at a greater or less distance from the center of motion in the platform to accommodate the required length of stroke of the piston.

What I claim as my invention, and desire to secure by Letters Patent, is—

1. The combination of a hand-lever O and platform M, oscillating together when connected with the piston-rod $k$ of a pump, substantially as described, so that the combined exertions of the muscular power of the arms and the weight of the body may be employed for working the pump.

2. The employment of the disks $m\ m$, in combination with the packing $f$, rod $k$, and piston-cylinder B′, arranged and operating substantially in the manner and for the purposes set forth.

3. The combination of the cylinder A and pipe or pipes C D, thimbles $e\ e$, bands $g\ g$, and wedges $h\ h$, substantially as shown and described.

In witness whereof I have hereunto signed my name in the presence of two subscribing witnesses.

T. J. WILLETT.

Witnesses:
  J. FRASER,
  S. J. ALLIS.